United States Patent [19]

Ruscheweyh

[11] Patent Number: 5,547,540
[45] Date of Patent: Aug. 20, 1996

[54] DEVICE FOR COOLING GASES AND OPTIONALLY DRYING SOLID PARTICLES ADDED TO THE GAS

[75] Inventor: Hans Ruscheweyh, Aachen, Germany

[73] Assignee: BDAG Balcke-Dürr Aktiengesellschaft, Ratingen, Germany

[21] Appl. No.: 286,487

[22] Filed: Aug. 3, 1994

[30] Foreign Application Priority Data

Aug. 3, 1993 [DE] Germany .............................. 43 25 968.5

[51] Int. Cl.⁶ ..................................................... B01B 1/00
[52] U.S. Cl. ........................ 159/4.08; 159/4.01; 261/79.2
[58] Field of Search ......................... 159/48.1, 4.01.4.08; 34/57 R; 261/88, 89, 79.1, DIG. 11, 79.2; 422/176

[56] References Cited

U.S. PATENT DOCUMENTS

| | | | |
|---|---|---|---|
| 4,187,617 | 2/1980 | Becker, Jr. et al. | |
| 4,380,491 | 4/1983 | Joy et al. | 159/4.01 |
| 4,571,311 | 2/1986 | Ferguson et al. | 159/4.01 |
| 5,032,222 | 7/1991 | Millioud | 159/48.1 |
| 5,227,017 | 7/1993 | Tanaka et al. | 159/48.1 |
| 5,232,550 | 8/1993 | Takashi et al. | 159/48.1 |
| 5,234,672 | 8/1993 | Ruscheweyh | 422/176 |

FOREIGN PATENT DOCUMENTS

| | | |
|---|---|---|
| 1163735 | 9/1958 | France . |
| 3229843 | 3/1983 | Germany . |
| 2178837 | 2/1987 | United Kingdom . |

*Primary Examiner*—Robert J. Warden
*Assistant Examiner*—Theresa T. Snider
*Attorney, Agent, or Firm*—Robert W. Becker & Associates

[57] ABSTRACT

The device for cooling gases and optionally drying solid particles within the gases has a vertically arranged reactor housing. The gases pass through the reactor housing in the vertical direction. At least one inlet line is connected with its mouth to the reactor housing for introducing the gases in the vertical direction into the reactor housing. At least one nozzle, arranged within the area of the mouth, for introducing a liquid and optionally solid particles into the gases is provided. The mouth is in the form of a shock diffusor. At least one insert for generating a leading edge vortex system is arranged within the vicinity of the shock diffusor.

3 Claims, 2 Drawing Sheets

DEVICE FOR COOLING GASES AND OPTIONALLY DRYING SOLID PARTICLES ADDED TO THE GAS

BACKGROUND OF THE INVENTION

The present invention relates to a device for cooling gases and optionally drying solid particles added to the gases, especially an evaporation cooler and spray dryers.

Such devices are known. They are comprised of a vertically arranged reactor housing into which the gas is introduced in the vertical direction via at least one inlet line and through which the gas flows in the vertical direction whereby a liquid is introduced into the gas after its introduction into the reactor housing and optionally solid particles are introduced via at least one nozzle. By evaporating the liquid heat of evaporation is removed from the gas so that the gas is cooled. If the added liquid additionally contains solid particles, these particles are dried by passing through the reactor housing.

The known devices in the form of evaporation coolers or spray dryers of the aforementioned kind have the disadvantage that the gas stream not only enters the reactor housing with a non-uniform velocity profile, viewed over the cross-section of the inlet line, but also, dependent on the design of the inlet line, with a flow direction that deviates from the center axis of the reactor housing. Within the reactor housing this results in liquid and temperature concentrations which require a greater constructive volume and lead to a reduced efficiency of the device. When adding solid particles, the risk of deposition at the sidewalls is present in the known devices, especially due to the lateral deflection of the gas stream. Such deposits lead to the need for cleaning operations of the reactor housing within relatively short time intervals which cause frequent downtimes of the device.

It is therefore an object of the present invention to provide a device of the aforementioned kind for cooling gases and optionally drying solid particles contained within the gases with which with a constructive expenditure as low as possible the aforedescribed disadvantages can be overcome such that the stream of the gases, independent of the design of the inlet line, can be introduced into the reactor housing uniformly and parallel to the longitudinal center axis of the reactor housing.

SUMMARY OF THE INVENTION

The device for cooling gases and optionally drying solid particles within the gases according to the present invention is primarily characterized by:

A vertically arranged reactor housing, wherein the gases pass through the reactor housing in the vertical direction;

At least one inlet line having a mouth and connected with the mouth to the reactor housing for introducing the gases in the vertical direction into the reactor housing;

At least one nozzle, arranged within an area of the mouth for introducing a liquid and optionally solid particles into the gases;

The mouth being in the form of a shock diffusor; and

At least one insert for generating a leading edge vortex system arranged within the vicinity of the shock diffusor.

Preferably, the at least one insert is positioned within the mouth. Preferably, in this arrangement at least one further insert is positioned downstream of the mouth.

In another preferred embodiment of the present invention, the at least one insert is positioned downstream of the mouth.

Advantageously, the at least one nozzle is positioned within the effective field of the at least one insert.

According to the present invention, the mouth of the inlet line is in the form of a shock diffusor and within the area of the shock diffusor at least one insert for producing a leading edge vortex system is arranged.

Due to the inventive embodiment of the mouth of the inlet line in the form of a shock diffusor an annular, uniform pressure field is produced at the entrance of the gases into the reactor housing which pressure field prevents a lateral deflection of the gas stream and results in a central orientation of the gas stream relative to the longitudinal center axis of the reactor housing. The insert or inserts which produce a leading edge vortex system in the area of the shock diffusor provide for an intensive and fast (i.e., on a shortest possible path) mixing of gas and liquid, respectively, solid particles so that the cooling and drying effects are already terminated after a short travel distance. Since the inserts which produce a leading edge vortex system operate at low loss and require only a minimal constructive expenditure, the inventive device does not require greater investments. It is also possible to retrofit already existing devices for cooling gases and optionally drying solid particles within the gas according to the present invention.

With the inventive design it is advantageous that despite a non-uniform flow profile within the inlet line a stable and uniform as well as central distribution of the gases, optionally containing solid particles, over the entire flow cross-section of the reactor housing is achieved whereby simultaneously a loading of the reactor walls with liquid and solid particles is prevented. The improved efficiency of the device resulting from the inventive design furthermore allows for the constructive volume of the reactor housing to be reduced so that the device can be manufactured less expensively. Furthermore, the service and monitoring expenditures are reduced since the previously required frequent cleaning operations are now obsolete. Finally, the downtimes resulting from the periodic cleaning operations are also eliminated.

The inserts for producing the leading edge vortex systems can be arranged within the area of the shock diffusor, but can be provided also additionally in the flow direction downstream of the shock diffusor within the reactor housing.

According to a further feature of the invention the nozzles for supplying liquid or solid particles are positioned within the effective field of the inserts for producing leading edge vortex systems so that the admixture of liquid, respectively, solid particles with the gas stream is optimized.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 9.

Figure 1:
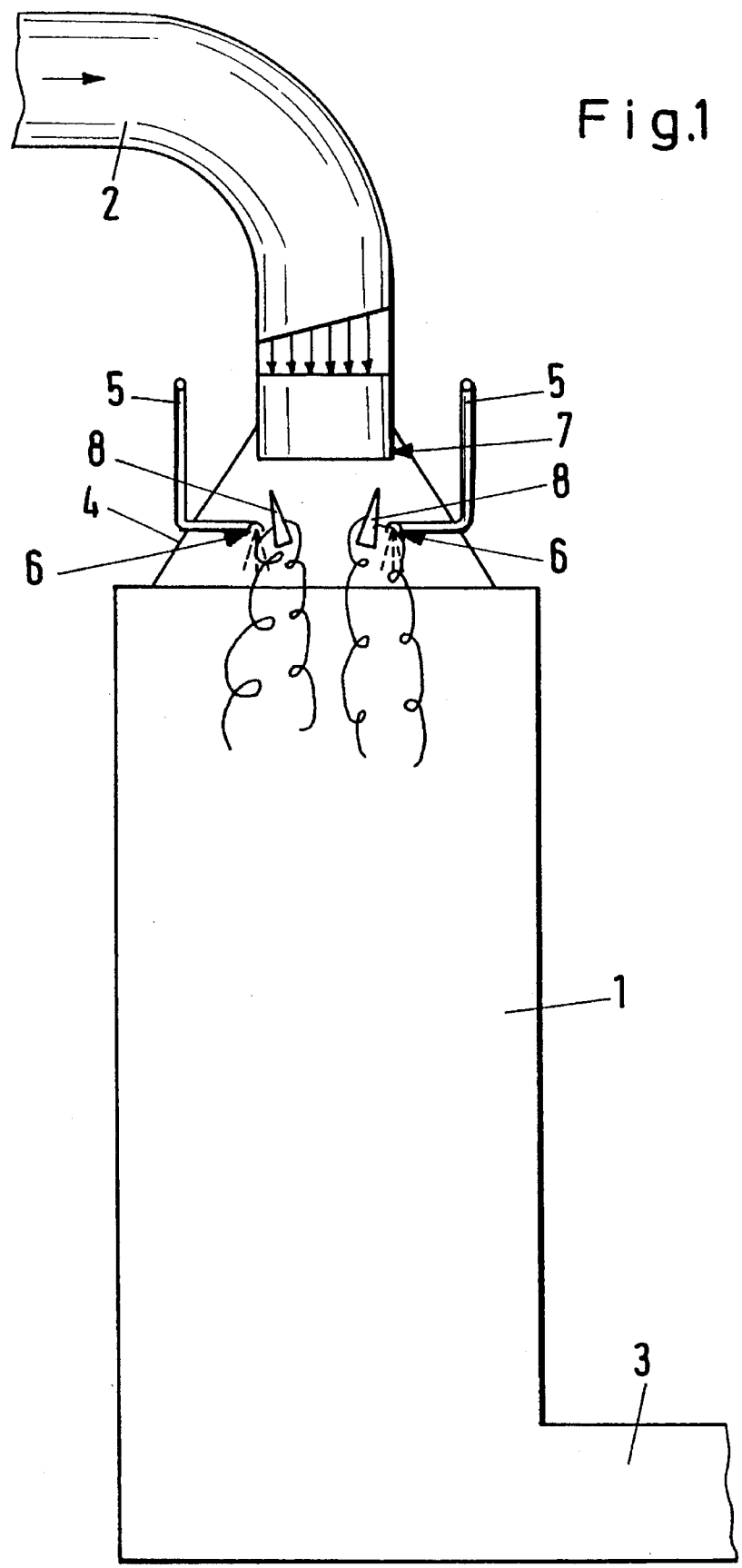
FIG. 1 shows a schematic vertical cross-sectional view of a first embodiment in the form of a spray dryer.

The spray dryer schematically represented in FIG. 1 has a vertically arranged reactor housing 1 into which the gas to be cooled is introduced from the top via inlet line 2. At the lower end of the reactor housing 1 the cooled gas is removed from the reactor housing via outlet line 3.

The inlet line 2 which initially extends horizontally and is then downwardly curved in order to be connected centrally at the top of the reactor housing 1 opens in the shown embodiment according to FIG. 1 into a funnel-shaped hood 4 of the reactor housing 1. In the area of the hood 4 a liquid is introduced into the gas stream to be cooled which by evaporation effects the cooling of the gas. FIG. 1 shows a plurality of liquid nozzles 6 arranged at the end of liquid inlet lines 5. Into the stream of liquid solid particles can be introduced.

Due to the curved design of the inlet line 2 a non-uniform velocity profile results over the cross-section of the inlet line 2 (shown in FIG. 1) before the gas stream is introduced into the reactor housing. Such a non-uniform velocity profile would not only result in a deviation of the flow direction of the gas stream from the center axis of the reactor housing 1, but also in the formation of liquid and temperature concentrations within the reactor housing 1. In order to prevent these effects, the mouth of the inlet line 2 is formed as a shock or thrust diffusor 7. In the shown embodiment according to FIG. 1 this is achieved by arranging a circular cylindrical ring which, as an extension of the inlet line 2, projects into the funnel-shaped hood 4. Due to this shock diffusor 7 a uniform pressure field is produced annularly about the entrance of the gas into the reactor housing 1 which pressure field, despite the non-uniform velocity profile of the gas stream entering the reactor housing, prevents a lateral deflection of the gas stream and produces a central alignment of the gas stream relative to the longitudinal center axis of the reactor housing 1.

In order to provide for an intensive and fast mixing (i.e., mixing along a short travel path) of the gas into the reactor housing 1 and of the liquid introduced via the liquid nozzles 6 into the gas stream and optionally the solid particles, inserts 8 for producing leading edge vortex systems are arranged in the area of the shock diffusor 7. These leading edge vortex systems provide for a static vortex course that with low vortex losses due to the flow components transverse to the main flow direction produces an intensive mixing and thus prevents the formation of temperature and velocity concentrations. In this manner, the cooling and drying effect of the added liquid and the solid particles added to the gas stream is terminated after a short travel distance so that the constructive height of the reactor housing 1 can be shortened. The inserts 8 which are arranged with their surfaces at an acute angle to the main flow direction of the gas result in a very small reduction of the flow cross-section so that the flow losses resulting from their presence are low. Furthermore, such inserts 8 require only a small constructive expenditure.

Figure 4:
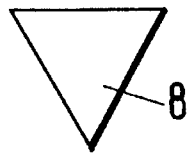
FIGS. 4 to 7 show four different embodiments for the design of inserts.
Figure 5:
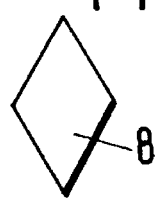
Figure 6:
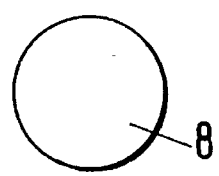
Figure 7:
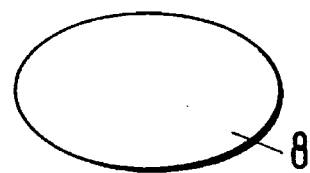

FIGS. 4 to 9 show embodiments for such inserts. FIG. 4 shows an insert 8 of a substantially triangular base shape which with one tip is arranged counter to the main flow direction. The insert 8 represented in FIG. 5 is diamond shaped and is also arranged with one tip counter to the flow direction and positioned at an acute angle to the main flow direction within the area of the shock diffusor 7. FIGS. 6 and 7 show circular, respectively, oval inserts 8 Which are also positioned at an acute angle to the main flow direction within the gas stream and generate with their leading edge a leading edge vortex system.

Figure 8:
FIGS. 8 and 9 shows cross-sections of such inserts.
Figure 9:

In order to further increase the intensity of the mixing vortex system and the static stability of the inserts 8 within the gas stream, these insert can be profiled according to the embodiment of FIG. 8, for example, can be provided with a V-shaped cross-section. According to FIG. 9 a stabilization of the inserts 8 can also be achieved by providing angled or angular edges.

In order to effect a fast mixing of the liquid with the gas stream, the liquid nozzles 6 are arranged within the effective field of the inserts 8, as shown in FIG. 1. FIG. 1 also shows that a retrofitting of a conventional spray dryer is possible without problems by mounting within the hood 4 a shock diffusor 7 and inserts 8.

Figure 2:
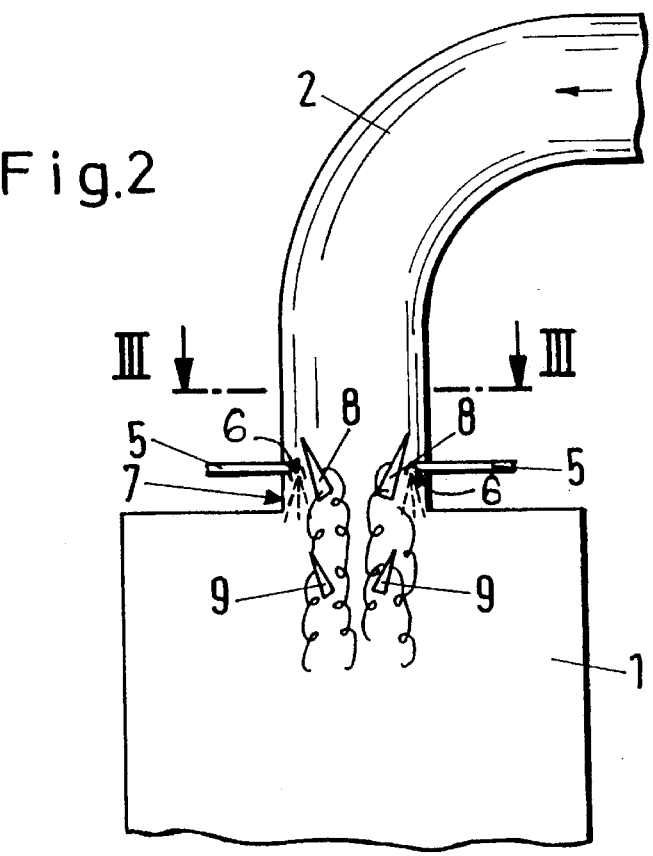
FIG. 2 shows a longitudinal section corresponding to FIG. 1 of the upper part of a second embodiment in the form of an evaporation cooler.
Figure 3:
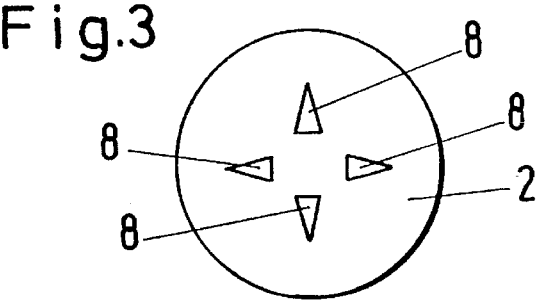
FIG. 3 shows a cross-section according to line III—III of FIG. 2.

In a second embodiment according to FIGS. 2 and 3 the shock diffusor 7 is realized by a corresponding embodiment of the transition between the inlet line 2 and the reactor housing 1. The rectangular transition between the inlet line 2 and the top side of the reactor housing 1 in FIG. 2 results automatically in a shock diffusor 7 when the inserts 8 may be inventively arranged. The cross-section of FIG. 3 shows an arrangement of four inserts 8 with a triangular base shape.

In the second embodiment according to FIG. 2 further inserts 9 are provided downstream of the shock diffusor 7 which with the leading edge vortex systems they generate improve the mixing effect and further shorten the required distance for mixing.

The present invention is, of course, in no way restricted to the specific disclosure of the specification and drawings, but also encompasses any modifications within the scope of the appended claims.

What is claimed is:

1. A device for cooling gases and optionally drying solid particles within the gases, said device comprising:

a vertically arranged reactor housing, wherein the gases pass through said reactor housing in the vertical direction;

at least one inlet line having a mouth and connected with said mouth to said reactor housing for introducing the gases in the vertical direction into said reactor housing;

at least one nozzle, connected to said inlet line at said mouth and opening into said inlet line, for introducing a liquid and optionally solid particles into the gases;

said mouth being a shock diffusor; and at least one first insert, for generating a leading edge vortex system positioned within said mouth such that the gases and the liquid and, optionally the solid particles are intensively mixed by said leading edge vortex system.

2. A device according to claim 1, further comprising at least one second insert positioned downstream of said mouth in a direction of introducing the gases.

3. A device for cooling gases and optionally drying solid particles within the gases, said device comprising:

a vertically arranged reactor housing, wherein the gases pass through said reactor housing in the vertical direction;

at least one inlet line having a mouth and connected with said mouth to said reactor housing for introducing the gases in the vertical direction into said reactor housing;

at least one nozzle, connected to said reactor housing downstream of said mouth in a direction of introducing the gases and opening into said reactor housing, for introducing a liquid and optionally solid particles into the gases;

said mouth being a shock diffusor; and at least one first insert, for generating a leading edge vortex system, positioned downstream of said mouth in said direction of introducing the gases such that the gases and the liquid and optionally the solid particles are intensively mixed by said leading edge vortex system.

* * * * *